United States Patent [19]

Hasegawa et al.

[11] Patent Number: 4,491,404

[45] Date of Patent: Jan. 1, 1985

[54] FLASH PHOTOGRAPHY SYSTEM

[75] Inventors: Hiroshi Hasegawa; Yoshiyuki Nakano, both of Tokyo; Yoshiaki Tanabe, Kawasaki, all of Japan

[73] Assignee: Nippon Kogaku K.K., Tokyo, Japan

[21] Appl. No.: 470,386

[22] Filed: Feb. 28, 1983

[30] Foreign Application Priority Data

Mar. 4, 1982 [JP] Japan .................................. 57/33086
Mar. 5, 1982 [JP] Japan .................................. 57/33753

[51] Int. Cl.³ .......................................... G03B 15/05
[52] U.S. Cl. .................................. 354/416; 354/459; 354/471; 354/127.1
[58] Field of Search ........... 354/127.1, 127.11, 127.12, 354/145.1, 413–423, 471, 474, 456, 458, 459, 32–35, 60 F, 139, 149, 145; 250/241 P

[56] References Cited

U.S. PATENT DOCUMENTS

| | | | |
|---|---|---|---|
| 3,710,701 | 1/1973 | Takishima et al. | 354/127.1 |
| 4,176,933 | 12/1979 | Watanabe | 354/127.12 |
| 4,304,478 | 12/1981 | Katayama et al. | 354/127.1 |
| 4,367,932 | 1/1983 | Ishikawa et al. | 354/415 |
| 4,425,033 | 1/1984 | Yukio et al. | 354/423 |

*Primary Examiner*—William B. Perkey
*Attorney, Agent, or Firm*—Shapiro and Shapiro

[57] ABSTRACT

There is provided a flash photography system which allows control of a relation between a light emission duration of a flash device and a full-open time of an exposing aperture of a focal plane shutter in an ideal condition. In the system, an electronic flash device comprises circuitry for producing an output representing the maximum discharge time period of illumination light and circuitry for transmitting the output to a camera when the flash device is coupled to the camera.

14 Claims, 23 Drawing Figures

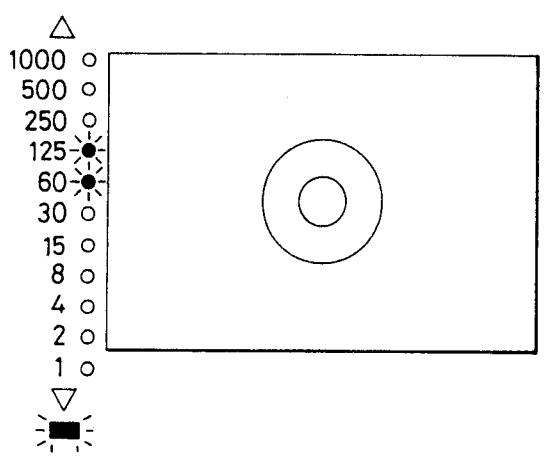
FIG. 6
FIG. 7
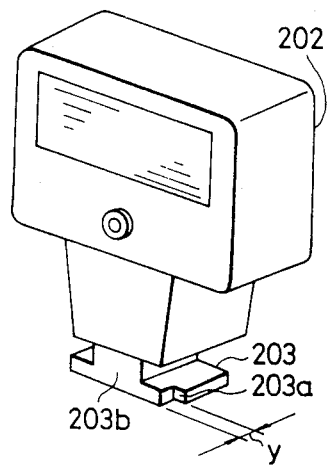
FIG. 8
FIG. 9
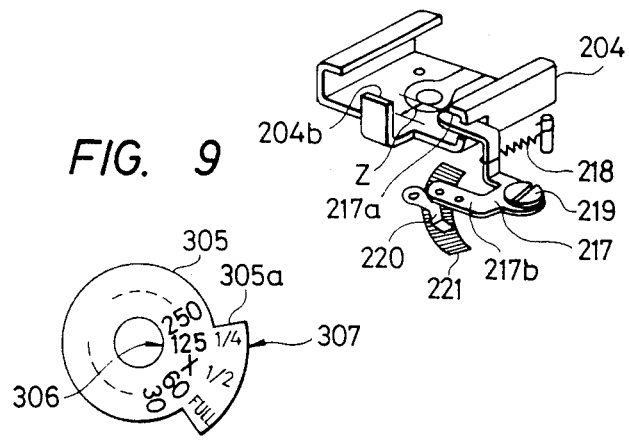
FIG. 11
FIG. 10
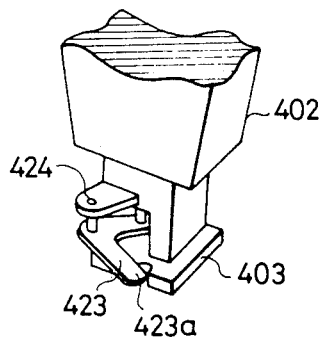
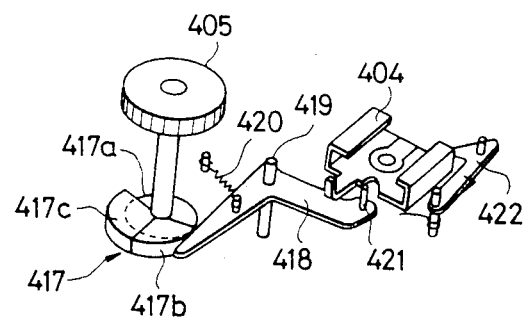

4,491,404

FLASH PHOTOGRAPHY SYSTEM

BACKGROUND OF THE INVENTION

The present invention relates to flash photography using an electronic flash device, and more particularly to a flash photography system having a camera equipped with a focal plane shutter.

When an object illuminated by a flash is to be photographed by a camera equipped with a focal plane shutter, exposure of a photograph is uneven along the direction of movement of a shutter closing curtain unless the light emission of the flash device started by the movement of a shutter opening curtain when an exposing aperture is fully opened is terminated before the shutter closing curtain appears in the aperture. Accordingly, in flash photography, it is necessary to set a shutter time or an exposure time long enough to avoid unevenness of exposure.

It has been known to detect the power-on of the flash device or the termination of charging of a main capacitor and supply a detected signal to a camera in order to automatically set the shutter time to a time in which no unevenness of exposure will occur. For example, see U.S. Pat. No. 4,016,575. Even in a compact flash device having a relatively short light emission duration, the shutter time is automatically set to the time corresponding to that of a large flash device having a relatively long light emission duration so that it can also be applicable to the large flash device. As a result, even if the flash device having the short light emission duration is used, a stop motion effect cannot be fully utilized.

Japanese Laid-Open Patent Application No. 91217/1974 (laid open on Aug. 31, 1974) discloses a technique to prevent the unevenness of exposure by forcibly stopping the light emission of the flash device by an electric signal which triggers the start of movement of the shutter closing curtain. In this method, however, a full quantity of light emitted by the flash device cannot be utilized and an underexposure condition due to the interruption of the light emission cannot be predicted before photographing. Thus, when the full quantity of light is not utilized, a range of distance which allows automatic light emission control in accordance with distance to an object is reduced by an unpredictable amount.

It has also been proposed to supply an electric signal which stops the light emission of an automatic light emission control type electronic flash device to a camera to start the closing operation of the shutter closing curtain. However, since it takes at least 2-3 milliseconds before the shutter closing curtain actually start to close the exposing aperture, a very long shutter time is needed and hence the photographing may be subject to the influence of a light source other than the flash device and an unclear or unnaturally colored photograph may be produced.

SUMMARY OF THE INVENTION

It is a primary object of the present invention to provide a flash photography system which allows control of a relation between a light emission duration of a flash device and a full-open time of an exposing aperture of a focal plane shutter in an ideal condition.

It is another object of the present invention to provide an electronic flash device which is useful to realize the above system.

It is a further object of the present invention to provide a camera which is useful to realize the above system.

In one aspect for realizing the system of the present invention, a flash device is provided which enables transmission of information relating to a maximum light emission duration to a camera. This information is displayed in the camera so that it is utilized to adjust a shutter time of the camera or it is utilized to adjust the maximum light emission duration of the flash device so that it is adapted to a preset shutter time.

In another aspect, a camera is provided which receives the above information from the flash device to display a minimum shutter time adapted to the maximum light emission duration. By confirming the display of the minimum shutter time, a user can set an exposure time adapted to the light emission of the flash device.

In a further aspect, a camera is provided having means for conveying information on an automatically or manually preset shutter time to a flash device, and a flash device is provided which receives the shutter time information conveyed from the camera and displays information on a light emission time capable of synchronizing with the preset shutter time.

BRIEF DESCRIPTION OF THE DRAWINGS

FIG. 6 shows a display in a finder of the camera device, FIG. 7 shows a perspective view of an embodiment of the flash device having a notch for a signal in a mounting leg, FIG. 8 shows a perspective view of a signal transmission mechanism of a mount of the camera device, FIG. 9 shows a plan view of a shutter time setting dial of the camera device, FIG. 10 shows a signal transmission mechanism of the camera device in accordance with another embodiment of the present invention, FIG. 11 shows a perspective view of a portion of the flash device adapted to the mechanism of FIG. 10.

DETAILED DESCRIPTION OF THE PREFERRED EMBODIMENTS

Figure 1:
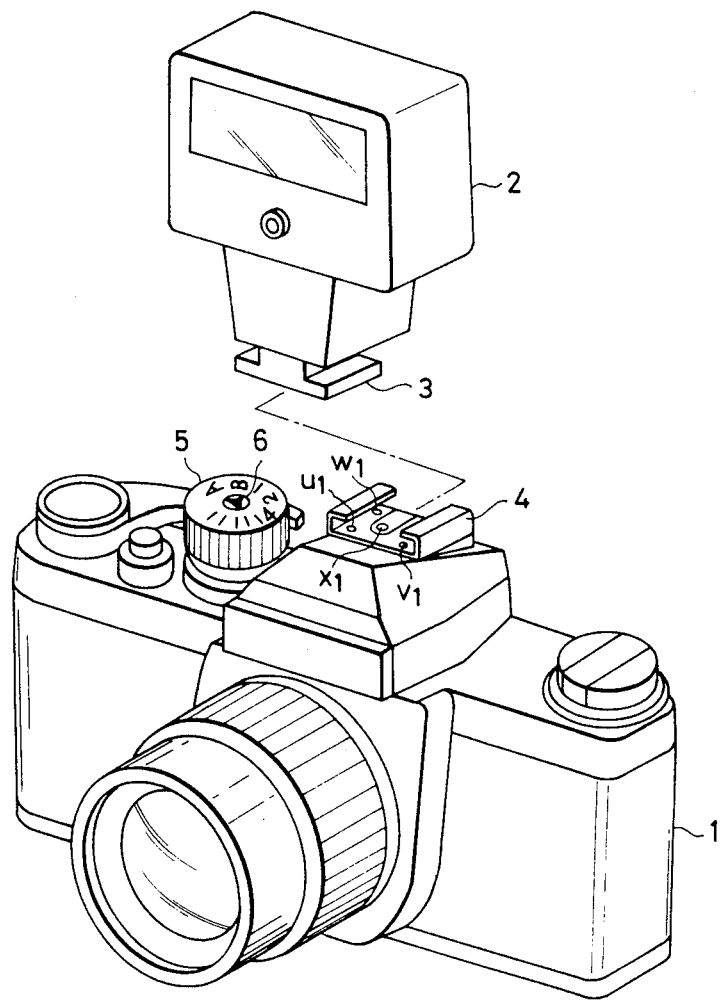
FIG. 1 shows a perspective view of a camera device and a flash device in accordance with one embodiment of the present invention.
Figure 2:
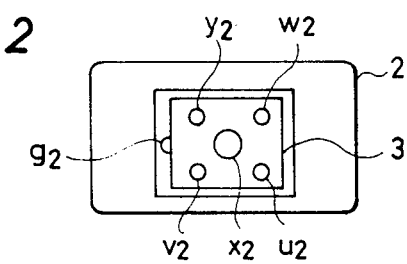
FIG. 2 shows a bottom view of the flash device of FIG. 1.

FIG. 1 shows an external view of a camera device 1 and an electronic flash device 2 attachable thereto. The flash device 2 has a mounting leg 3 and the camera device 1 has a mount 4. The mounting leg 3 can be coupled to the mount 4. As shown in FIG. 2, the mounting leg 3 has electric connecting terminals $u_2$, $v_2$, $w_2$, $x_2$ and $y_2$ and a ground terminal $g_2$, and the mount 4 has electric connecting terminals $u_1$, $v_1$, $w_1$, $x_1$ and $y_1$ which are coupled to the corresponding ones of the terminals of the mounting leg 3 when it is mounted to the mount 4.

A shutter time set by a shutter time setting dial 5 on the camera device 1 is indicated by an index 6, and a signal representative of the set shutter time is produced at connecting terminal $v_1$, thence it is transmitted to the terminal $v_2$. The connecting terminals $v_1$ and $v_2$ are also used to transmit a signal representative of a maximum light emission quantity from the flash device 2 to the camera device 1 by operating a switch of the flash device 2 to be described later.

Figure 3:
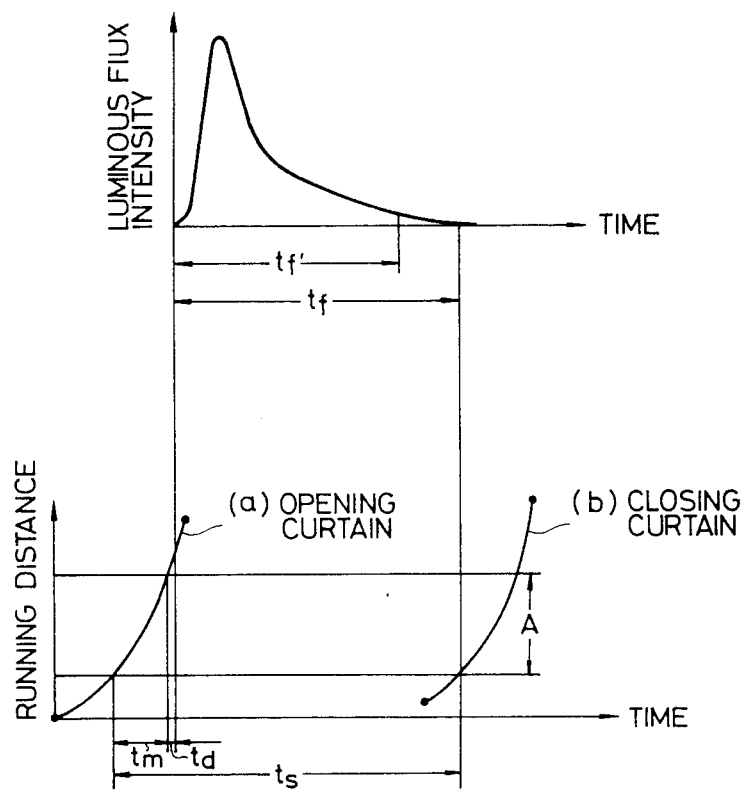
FIG. 3 shows an operational characteristic of a focal plane shutter of the camera device and a light emission characteristic of the flash device.

The shutter time set by the camera device 1 is represented by a time difference between a movement curve a of the opening curtain and a movement curve b of the closing curtain, as shown in FIG. 3. For a given shutter time $t_s$, a time $t_f$ available for the light emission of the flash device 2 is expressed as follows.

$$t_f = t_s - t_m - t_d - \alpha$$

where $t_m$ is a travelling time necessary for the opening curtain to cross an aperture A, $t_d$ is a time period from a time point when the opening curtain fully opens the aperture A to a time point when a synchronizing contact is turned on, and $\alpha$ is a margin time which is set taking a variation of the shutter time $t_s$ and a variation of the time period $t_d$ into consideration.

Of the above times, $t_m$, $t_d$ and $\alpha$ vary depending on the type of movement of the focal plane shutter, for example, vertical scan, horizontal scan or rotary scan, and the structure of the synchronizing contact, and hence they differ from one type of camera to another type of camera. Thus, a shutter time signal representing the time $t_f$ which is available to the light emission of the flash device 2 is supplied from the camera device 1 to the flash device 2 through the terminals $v_1$ and $v_2$. A compare circuit in the flash device 2 compares the time $t_f$ with the light emission duration of the flash device 2. If the time $t_f$ is shorter than the light emission duration, an alarm is issued.

The light emission characteristic of a conventional electronic flash device has a tendency that the light emission quantity concentrates in the front half of the light emission period, as shown by a graph of FIG. 3. Since the light emission quantity at the end of the light emission period is relatively small, an effective light emission period of the flash device to be compared with the time $t_f$ can be regarded as $t_f'$.

Figure 4:
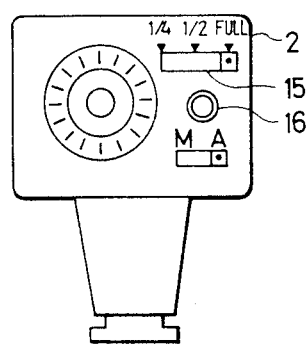
FIG. 4 shows a rear view of the flash device of FIG. 1.

As shown in FIG. 4, a selector 15 for selecting a light emission quantity is provided on a rear surface of the flash device 2. When the selector 15 is set to a FULL position, a ½ position and a ¼ position, all, 50% and 25% of the maximum light emission quantity, respectively, can be utilized.

The flash device 2 receives the signal representative of the time $t_f$ from the camera device 1 and compares the time $t_f$ with the light emission period selected by the selector 15. If the light emission period is longer than the time $t_f$, a lamp 16 is lit to issue an alarm.

Figure 5:
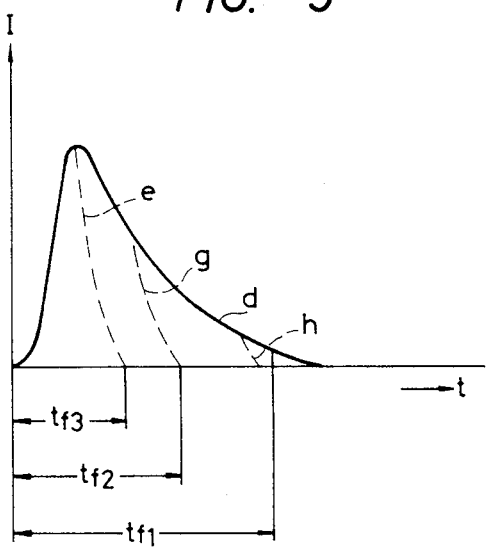
FIG. 5 shows a light emission characteristic of the flash device.

Curves d, g and e of FIG. 5 show light emission characteristics for the FULL, ½ and ¼ positions, respectively. If the light emission period is longer than the time $t_f$ representative of the selected shutter speed the lamp 16 is lit. Thus, the light emission period is reduced so as to be shorter than the time $t_f$ by operating the selector 15 so that a proper light emission period which will not result in unevenness of exposure can be determined. Alternatively, the light emission period may not be changed but the shutter time may be set by the shutter dial 5 such that the time $t_f$ is longer than the light emission period. Even if the aperture full-open time determined by the shutter time thus set is reduced to $t_{f1}$, $t_{f2}$ or $t_{f3}$, unevenness of exposure does not occur.

Even with the selector 15 at the FULL position, the light emission may be stopped at the end of the period as shown by a curve h in order to shorten the total light emission period.

When the flash device is ready to emit light, a signal indicating the maximum light emission quantity produced in the flash device is transmitted to the camera device and a shutter time automatically set in accordance with that signal is indicated in a finder of the camera device at an intermediate point between 1/125 seconds and 1/60 seconds, that is, at approximately the 1/90 seconds point, as shown in FIG. 6. If the camera device has no automatic shutter time setting function, any shutter time no faster than 1/90 seconds may be manually set by utilizing the indication so that the time $t_f$ can be set to be longer than the light emission period.

In a flash device of a type in which the maximum light emission period is fixed and not variable, it is desirable to mechanically transmit a signal representative of the maximum light emission period to the camera device.

In a flash device 202 of such a type shown in FIG. 7, a mounting leg 203 has a notch 203a with a depth y of the notch corresponding to the maximum light emission period inherent to the flash device 202.

As shown in FIG. 8, a camera body has a mount 204 which is to be connected to the mounting leg 203. The notch 203a of the mounting leg 203 abuts against one end 217a of a lever 217 and a front end 203b abuts against a stop 204b of the mount 204. Accordingly, the depth y representative of the inherent maximum light emission period is transmitted to the camera device as a rotation angle around a shaft 219 of the lever 217.

The lever 217 is biased clockwise by a spring 218 and has a sufficient rotation angle around the shaft 219.

A brush 220 is mounted on the other arm 217b of the lever 217 and the brush 220 slides on a resistor 221. Thus, the rotation angle of the lever 217 is represented by a resistance determined by the brush 220 and the resistor 221.

FIG. 9 shows an embodiment in which a portion of the outer periphery of a shutter dial 305 is provided with a member 305a which indicates upper limits of the light emission period imparted to the flash device. In the illustrated camera device, when a 1/125 second indication and a 1/60 second indication face an index 306, a ¼ indication and a FULL indication face an index 307, respectively. In the present embodiment, an X indication corresponds to 1/90 second. When the X indication faces the index 306. A ½ indication faces the index 307. Thus, by referring to this, the selector 15 of the flash device shown in FIG. 4 can be set to one of the ¼, ½ and FULL positions. Since the time required to emit the full, ½ or ¼ of the maximum light quantity may vary from one flash device to another, time indications may be used so that they are applicable to any type of flash device.

In accordance with an arrangement shown in FIGS. 10 and 11, the signal representative of the shutter time set by the camera device can be transmitted to the flash device as a mechanical displacement. A cam 417 is fixed under a shutter dial 405 and rotates in unison with the dial 405. The cam 417 has a non-displacement region 417a corresponding to a shutter time region in which flash photography is impossible with a focal plane shutter, such as 1/1000 second or 1/500 second, a region 417b which has shutter times corresponding to changes of the light emission period of the flash device and whose radius changes in accordance with the shutter time, and a non-displacement region 417c corresponding to a shutter time region which permits flash photography. The lifting of the cam 417 is reversed by a lever 418. The lever 418 is biased clockwise around a shaft 419 by a spring 420. Thus, a pin 421 projecting at one end of the lever 418 approaches a mount 404 when the lifting of the cam 417 is large and goes away from the mount 404 when the lifting of the cam 417 is small.

A hook 422 is provided to prevent the detachment of the flash device so that the signal stroke is positively transmitted.

As shown in FIG. 11, a flash device 402 has a mounting leg 403 on which a lever 423 is rotatably mounted by a shaft 424, and when the mounting leg 403 is inserted into the mount 404 of FIG. 10, the lever 423 is rotated counterclockwise by the abutment of pin 421 and an end 423a of the lever 423. The counterclockwise rotation angle is electrically sensed by a potentiometer in the flash device to produce a shutter time signal. The sensing may be effected by a known method and hence it is not discussed here.

By combining the mechanisms of FIGS. 10 and 11 and the shutter dial 305 of FIG. 9 or by indicating the shutter time set by the shutter dial in the vicinity of the selector 15 of the flash device, the maximum light emission period can be properly selected.

In the embodiments heretofore described, a plurality of shutter time signals are produced in accordance with the setting of the shutter time by the camera device. The present system also works effectively when the shutter time signal is produced only when the shutter time is set to a particular X second position. The X second may differ from one type of camera to another type of camera but a user may photograph with the flash device without paying attention to the different limits of the light emission period of the flash device when the X second position is selected.

Figure 12:
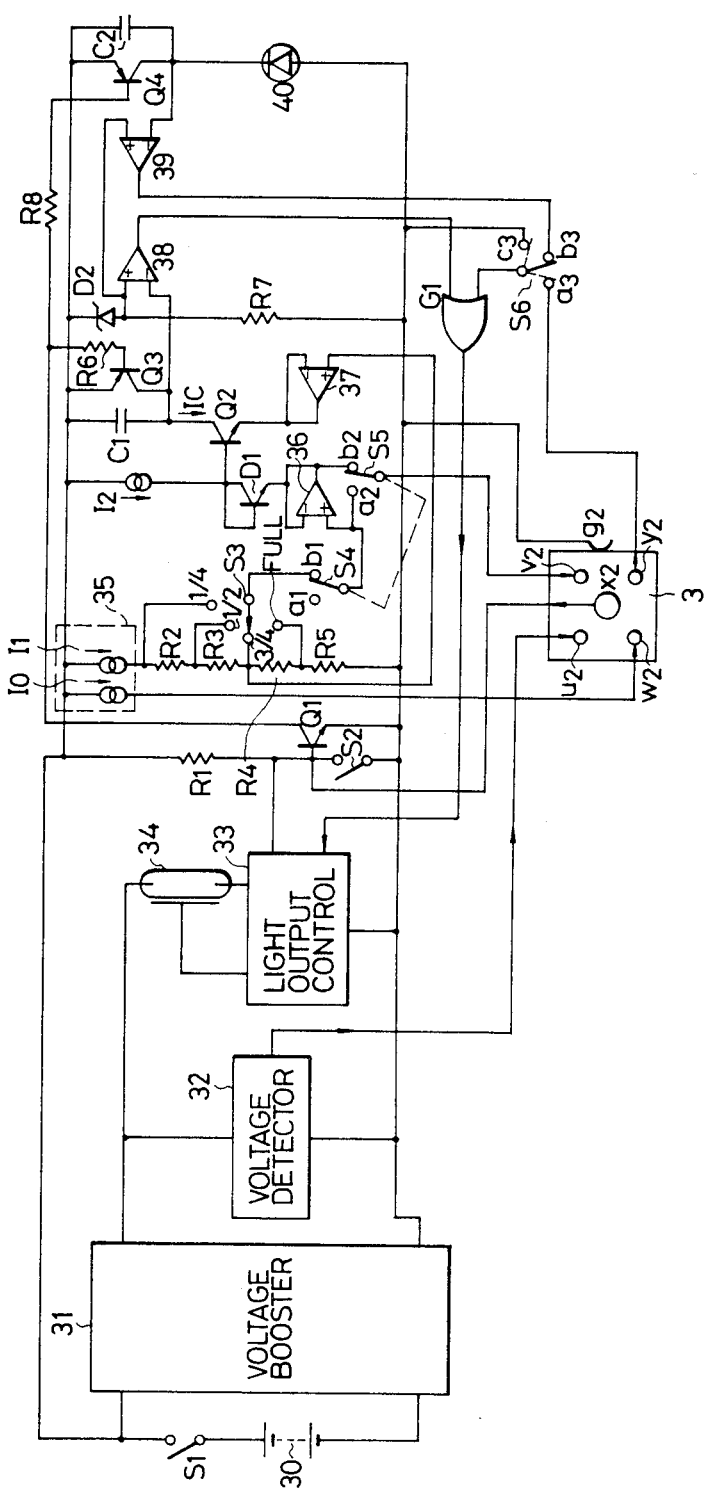
FIG. 12 shows a circuit diagram of the flash device in accordance with one embodiment of the present invention.

FIG. 12 shows a specific embodiment of a circuit of the electronic flash device 2 which allows the adjustment of the maximum light emission period.

A power supply 30 supplies power to the circuit through a power switch $S_1$. A voltage booster boosts the power supply voltage to charge up a main capacitor, not shown. When the charged voltage reaches a predetermined level, a voltage detector 32 produces an end of charge signal, which is transmitted to the camera device 1 through the terminal $u_2$. When the synchronizing contact of the camera device 1 is turned on, a start of light emission signal is transmitted from the camera device 1 to a light output controller 33 through the terminal $x_2$, and a flash discharge tube 34 starts to emit flash light. A constant current source 35 generates currents $I_0$ and $I_1$ which are proportional to absolute temperature. Resistors $R_2$, $R_3$, $R_4$ and $R_5$, a switch $S_3$, an operational amplifier 36, a transistor $D_1$, a transistor $Q_2$, an operational amplifier 37, an integration capacitor $C_1$, a zener diode $D_2$ and a comparator 38 form a light emission period limit circuit. The light emission period limit circuit sets a maximum light emission period by the switch $S_3$ which is linked to the selector 15 of FIG. 4, and when the maximum light emission period is reached, the comparator 38 generates a stop of light emission signal. A comparator 39, an integration capacitor $C_2$ and a photo-diode 40 form an automatic light control circuit. A switch $S_2$ which is turned on or off before the start of light emission, transistors $Q_1$, $Q_3$ and $Q_4$ and resistors $R_1$ and $R_2$ form a reset circuit. The reset circuit discharges the integration capacitors $C_1$ and $C_2$ before the start of light emission and resets the light emission period limit circuit and the automatic light control circuit. Switches $S_4$ and $S_5$ are ganged. When they are connected to terminals $a_1$ and $a_2$, respectively, the maximum light emission period is determined by a shutter time set by the camera device. When the switches $S_4$ and $S_5$ are connected to terminals $b_1$ and $b_2$, the maximum light emission period set by the flash device 2 is transmitted to the camera device. A switch $S_6$ is a selection switch to select a light control mode. When it is connected to a terminal $a_3$, a so-called TTL light control mode is selected and a stop of light emission signal is received from the camera device. When the switch $S_6$ is connected to a terminal $b_3$, a stop of light emission signal from the automatic light control circuit is received. When it is connected to a terminal $c_3$, a manual light emission mode is selected.

The setting of the maximum light emission period by the light emission period limit circuit is now explained in detail. In FIG. 12, voltages developed at the junctions of the resistors $R_2$–$R_5$ are supplied to the operational amplifier 36 as voltages corresponding to the maximum light emission periods through the selection switches $S_3$ and $S_4$. A constant voltage is supplied to a non-inverting input terminal of the operational amplifier 37, and an output terminal and an inverting input terminal thereof are connected to an emitter of a transistor $Q_2$. A diode-connected transistor $D_1$ and the transistor $Q_2$ from a current logarithmic compression-expansion circuit. It is now assumed that a resistance of the resistors selected by the switch $S_3$, that is, $R_4$ and $R_5$ in the embodiment of FIG. 12 is represented by $R_N$ and a resistance of the resistors which develop the voltage supplied to the non-inverting input terminal of the operational amplifier 37, that is, $R_4$ and $R_5$ in FIG. 12 is $R_K$. Thus, a voltage at the non-inverting input terminal of the operational amplifier 36 is expressed by $R_N I_1$, and a voltage at the non-inverting input terminal of the operational amplifier 37 is expressed by $R_K I_1$. Accordingly, $$R_N I_1 + \frac{KT}{q} \ln \frac{I_2}{I_S} \approx R_K I_1 + \frac{KT}{q} \ln \frac{I_C}{I_S} \quad (1)$$

where K is Boltzmann's constant, q is electron charge, T is absolute temperature, $I_S$ is backward saturation current of the transistors $D_1$ and $Q_2$, and $I_C$ is collector current of the transistor $Q_2$. Thus, $I_C$ is expressed by $$I_C = I_2 \exp\left\{ \frac{q}{KT} (R_N - R_K) I_1 \right\} \quad (2)$$

Since $I_1$ is proportional to the absolute temperature, it can be expressed by $I_1 = A \cdot T$ (constant). By erasing $I_1$ from the equation (2), we get $$I_C = I_2 \exp\left\{ \frac{q}{K} (R_N - R_K) A \right\} = \quad (3)$$

$$I_2 \exp\left\{ \ln 2 \cdot \frac{1}{\ln 2} \frac{q}{K} (R_N - R_K) A \right\}$$

$$\left\{ \frac{1}{\ln 2} \frac{q}{K} (R_N - R_K) A \right\} = I_2 \cdot 2$$

By appropriately selecting $R_N$ and $R_K$, $I_C$ can be expressed by an exponential current with a base of 2. Since the integration capacitor $C_1$ is charged by this current, a charged voltage $V_C$ of the capacitor $C_1$ is expressed by $$V_C = \int_0^t I_C dt = I_2 \cdot t \cdot 2 \left\{ \frac{1}{\ln 2} \frac{q}{K} (R_N - R_K) A \right\} \quad (4)$$

This voltage is compared with a reference voltage developed by the zener diode $D_2$ by the comparator 38 so that a charge time $t_1$ for the capacitor $C_1$ is determined from the equation (4). Since the measurement of the time is started from a time point when the synchronizing contact of the camera device is turned on, the transistor $Q_1$ is turned off and the transistor $Q_3$ is turned off, the resistors may be selected by the switch $S_3$ such that the charge time t is equal to the full-open time of the exposing aperture. As the synchronizing contact is turned on, the transistor $Q_4$ is turned off and the photodiode 40 starts to measure the light quantity, and when a proper exposure light quantity is reached, the comparator 39 produces an output signal. This output signal is applied to the controller 33 through the switch $S_6$ and the OR gate $G_1$ to control the light emission of the discharge tube. An output signal produced by the comparator 38 is also applied to the controller 33 through the gate $G_1$. When the flash device is automatically light-controlled with a shorter time than the light emission period selected by the switch $S_3$, the OR gate $G_1$ imparts a priority to the signal of the automatic light control circuit for the selection by the selector 15. The light output controller 33 is operated by the light control signal from the camera device when the switch $S_6$ is connected to the terminal $a_3$, and operated by the light measurement signal from the flash device when the switch $S_6$ is connected to the terminal $b_3$. When the switch $S_6$ is connected to the terminal $c_3$, the manual light emission mode is selected.

Figure 13:
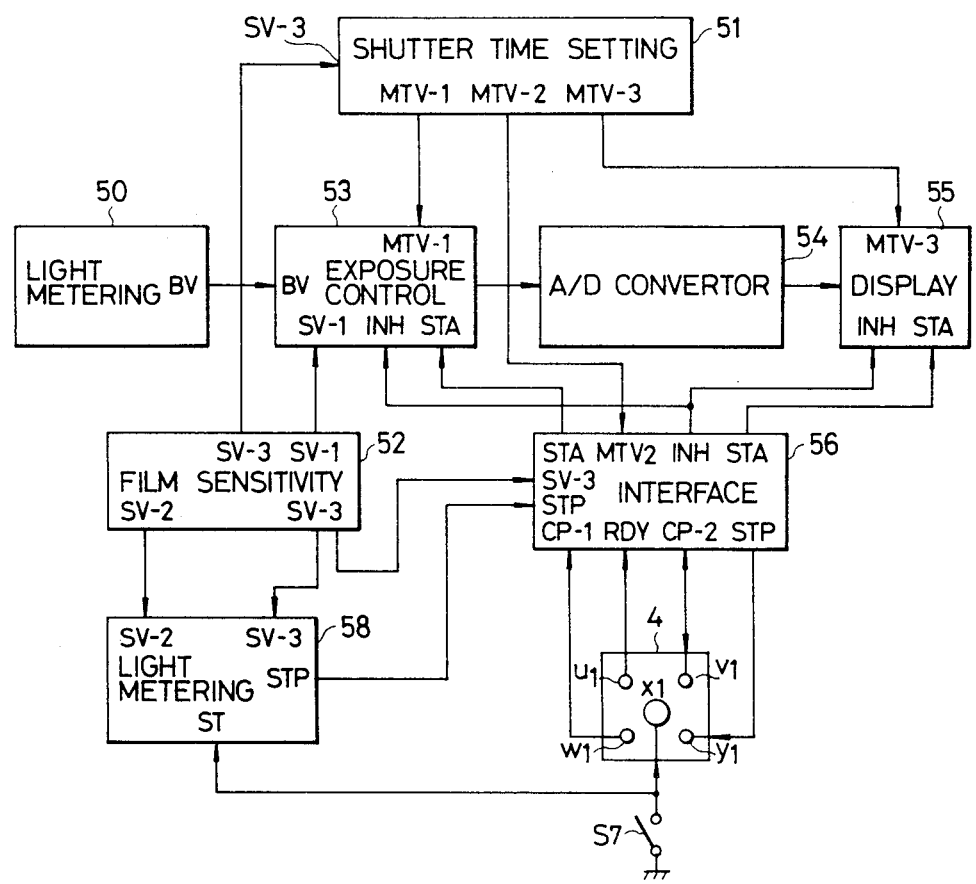
FIG. 13 shows a block diagram of an electric circuit of the camera device in accordance with one embodiment of the present invention.
Figure 14:
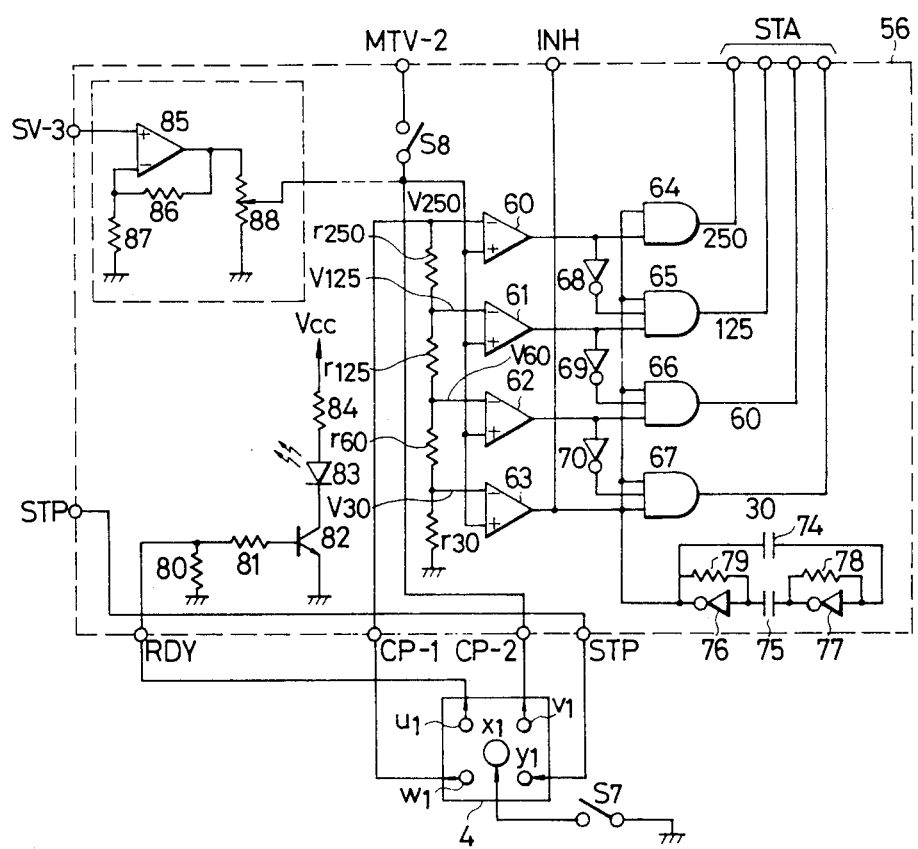
FIG. 14 shows an interface circuit of FIG. 13.

A circuit configuration in the camera device 1 is shown in FIG. 13. A light metering circuit 50 measures a luminance value (Bv) of an object and an aperture value (Av) of a lens. A circuit 51 is coupled to the shutter dial 5 and produces a shutter time (Tv) signal. A circuit 52 receives a film sensitivity (Sv) signal. An exposure control circuit 53 receives the signals Bv, Sv, Av and Tv to control the shutter time. The camera body 1 further includes an A/D converter 54, a shutter information indication circuit 55 and an interface circuit 56 for the flash device 2. Another light metering circuit 58 is provided to effect the TTL light control by the light from a flash-illuminated object during exposure of a film. A switch $S_7$ represents a synchronizing contact which is closed when the shutter opening curtain fully opens the aperture. The interface circuit 56 includes resistors $r_{30} - r_{250}$, comparators 60–63, inverters 68–70, AND gates 64–67 and a multivibrator comprising circuit components 74–79, as shown in FIG. 14. Resistors 80 and 81, a transistor 82, a light emitting diode 83, a resistor 84 and a voltage supply Vcc form a light emission ready indicator of the flash device.

An operational amplifier 85, resistors 86 and 87 and a potentiometer 88 form a circuit which receives the maximum light emission period information from the electronic flash device 202 of FIG. 7 or 8 through mechanical signal transmission means. The operational amplifier 85 amplifies a voltage signal applied to an input terminal SV-3 and has the potentiometer 88 connected to an output terminal thereof. When a mechanical light emission signal is present at the leg of the flash device 202, the position of a sliding arm of the potentiometer 88 changes in accordance with the signal at the leg so that a voltage corresponding to the light emission period of the flash device 202 is generated. This voltage is supplied to comparators 60–63 as shown by a broken line in FIG. 14 so that one of light emitting diodes $D_{401}-D_{411}$ of a display circuit 55 of FIG. 15 which corresponds to a shutter time to be selected blinks. Since the maximum light emission period information can be transmitted from the terminal $v_1$ of the mount to the flash device, the flashing time can be automatically set or an alarm can be issued by the flash device.

The end of charge signal is supplied to the transistor 82 of FIG. 14 from the voltage detector 32 of FIG. 12 through the terminals $u_2$ and $u_1$ and the light emitting diode 83 is fired to indicate the end of charge. When the switch $S_8$ is in the OFF position, the light emission period signal is supplied to the comparators 60–63 from the flash device through the terminal $v_1$, and when the switch $S_8$ is in the ON position, the shutter time information is supplied to the flash device from the circuit 51 through the terminal $v_1$.

Figure 15:
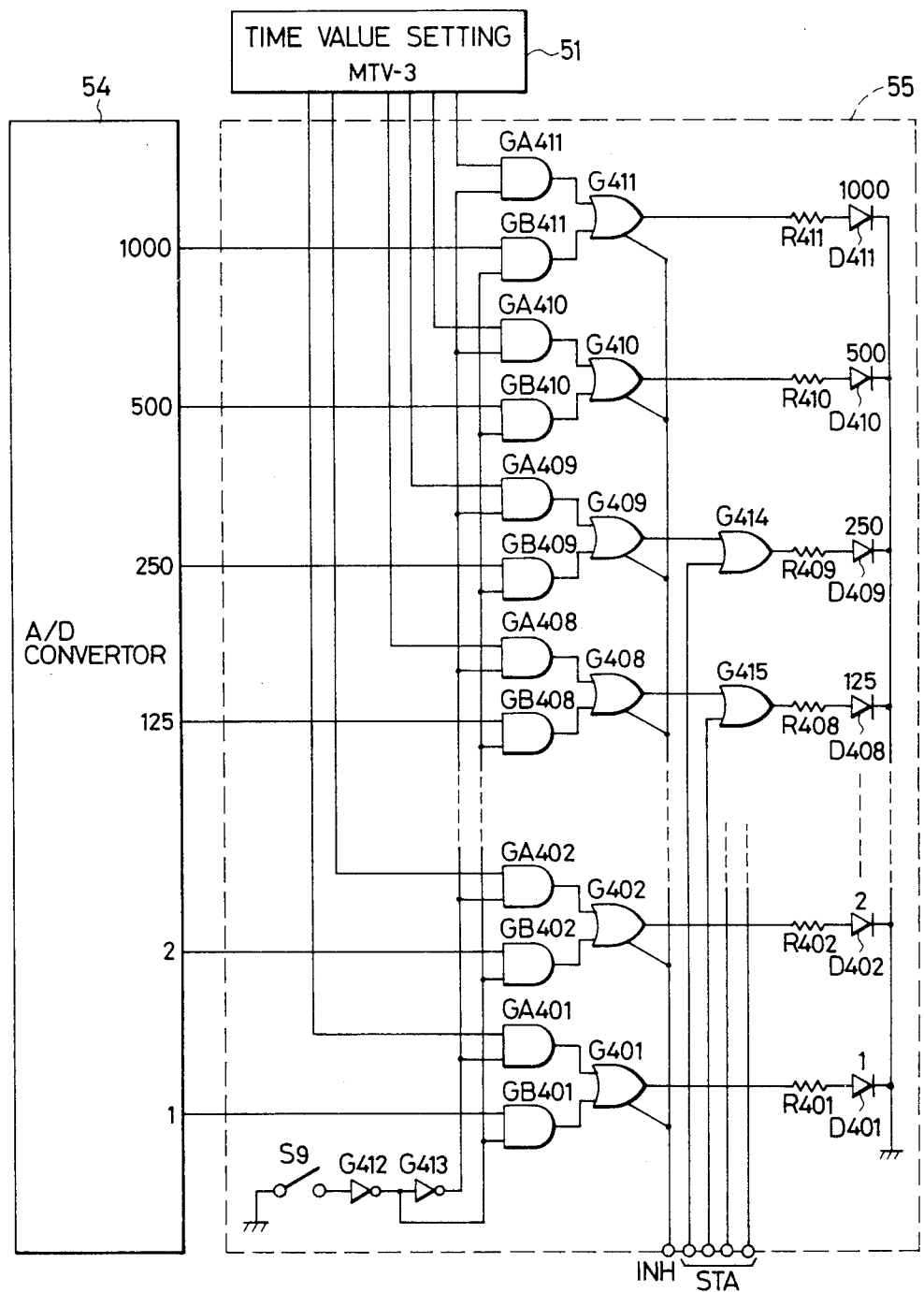
FIG. 15 shows a display circuit of FIG. 13.

FIG. 15 shows a specific circuit of the display circuit 55. Resistors $R_{401}-R_{411}$ and light emitting diodes $D_{401}-D_{411}$ form the display circuit to indicate the shutter time. AND gates $GA_{401}-GA_{411}$, $GB_{401}-GB_{411}$, OR gates $G_{401}-G_{411}$, $G_{414}$, $G_{415}$, ..., inverters $G_{412}$ and $G_{413}$ and a switch $S_9$ selectively receive an auto-shutter time signal, a manual shutter time signal and the light emission period signal from the A/D converter 54, the circuit 51 and the interface circuit 56 of FIG. 14, respectively, and transmit them to the display circuit. The light emitting diodes $D_{401}-D_{411}$ indicate the shutter times of 1-1/1000 seconds. The switch $S_9$ selects the auto-shutter time indication or the manual shutter time indication. When it is in the ON position, the display circuit indicates the shutter time of 1/1000-1 second in accordance with the output of the A/D converter 54, and when it is in the OFF position, the display circuit indicates the manual shutter time in accordance with the output of the circuit 51.

Figure 16:
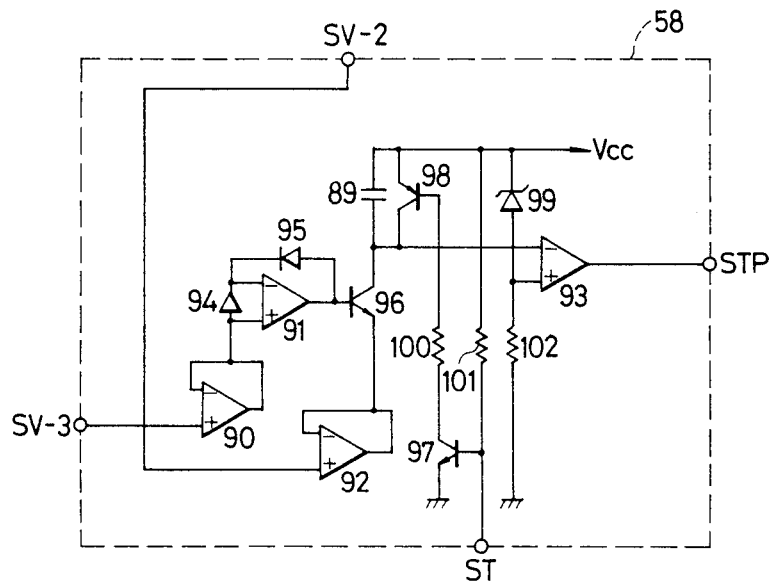
FIG. 16 shows a light quantity measuring circuit for TTL light control of FIG. 13.
Figure 17:
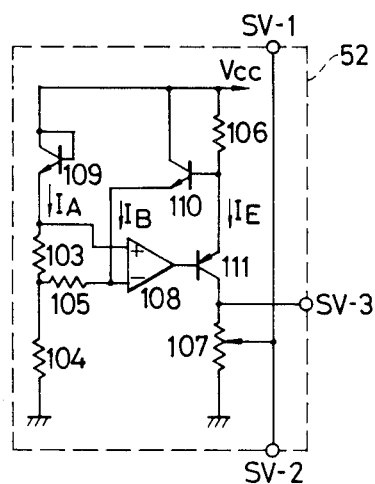
FIG. 17 shows a circuit for producing film sensitivity information of FIG. 13.
Figure 18:
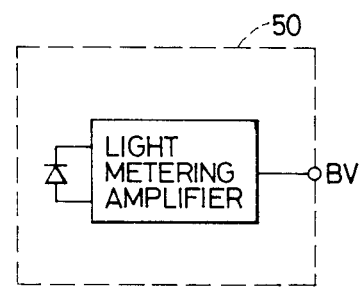
FIG. 18 shows a light quantity measuring circuit of FIG. 13.
Figure 19:
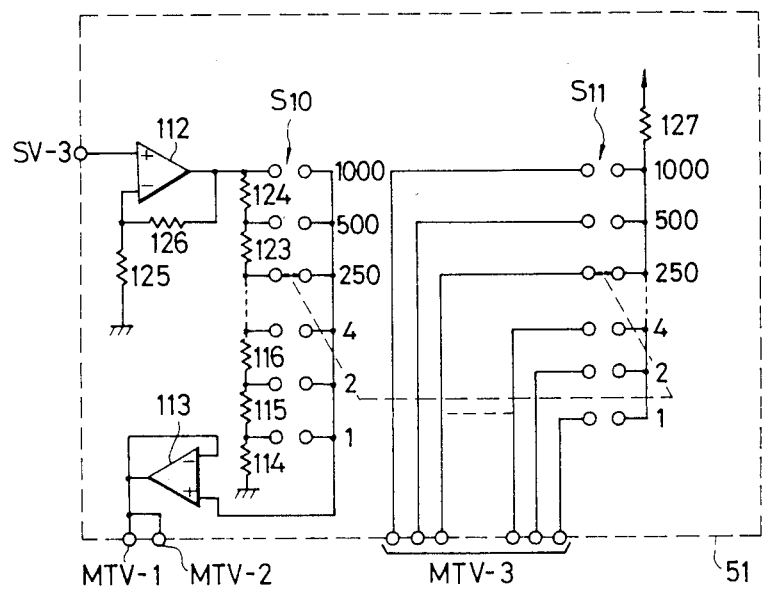
FIG. 19 shows a shutter time setting circuit of FIG. 13.
Figure 20:
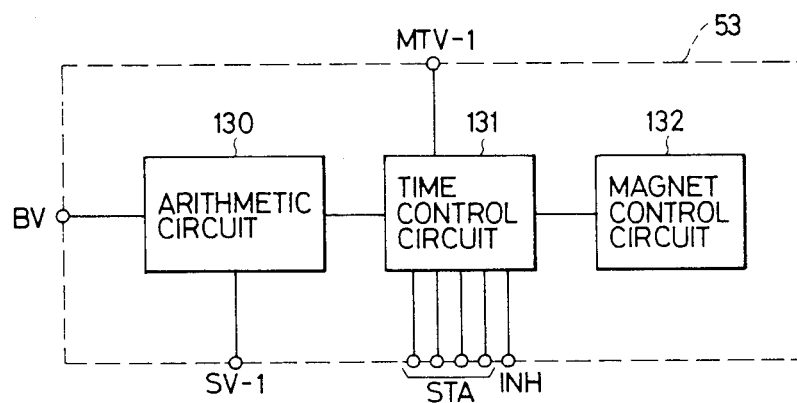
FIG. 20 shows a block diagram of an exposure control circuit of FIG. 13.

The light metering circuit 58 shown in FIG. 16 is used when the TTL light control is effected using the flash device. The circuit 58 comprises operational amplifiers 90, 91 and 92, a comparator 93, a photo-diode 94, a logarithmic compression diode 95, transistors 96, 97 and 98, a zener diode 99 and resistors 100, 101 and 102. FIG. 17 shows the circuit 52 which generates a voltage proportional to film sensitivity. The circuit 52 comprises resistors 103-106, a film sensitivity inputting potentiometer 107, an operational amplifier 108, transistors 109 and 110 of equal characteristic and a transistor 111. FIG. 18 shows the light metering circuit 50 which measures the luminance value of an object. FIG. 19 shows the circuit 51 for generating a voltage for setting the manual shutter time and a selection signal. The circuit 51 comprises operational amplifiers 112 and 113, resistors 114-124 for developing voltages corresponding to the shutter times of 1-1/1000 seconds, resistors 125, 126 and 127, and ganged switches $S_{10}$ and $S_{11}$ which are used to select the shutter time. FIG. 20 shows the exposure control circuit 53 which comprises an arithmetic circuit 130, a time control circuit 131 and a magnet control circuit 132.

A sequence of operations when a flash device having a preadjustable maximum light emission period is mounted on the camera device will now be explained. When the main capacitor of the flash device has been charged, the end of charge signal is supplied to the terminal RDY of FIG. 14 through the terminals $u_2$ and $u_1$ and the transistor 82 is turned on so that the light emitting diode 83 arranged within the finder of the camera device is fired. By connecting the switches $S_4$ and $S_5$ of FIG. 12 to the terminals b, the voltage corresponding to the maximum light emission period selected by the switch $S_3$ is developed at the terminal $v_2$ of the flash device. This voltage is supplied to the non-inverting input terminals of the comparators 60-63 of the interface circuit 56 through the terminal $v_2$ of the camera device of FIG. 14 and the terminal CP-2. The switch $S_8$ is now opened to block the signal from the time generation circuit 51. The shorter the maximum light emission period is, the higher is the above voltage. A current flows into the terminal CP-1 from the current source $I_0$ of the flash device through the terminals $w_2$ and $w_1$ so that voltages $v_{30}$-$v_{250}$ are developed across resistors $r_{30}$-$r_{250}$. Each of these voltages represents a maximum light emission period of the flash device which does not result in unevenness of exposure for a given shutter time. For example, $v_{250}$ corresponds to the maximum light emission period for the shutter time of 1/250 second. Assuming that the voltage applied to the terminal CP-2 is one which corresponds to the shutter time of 1/125 second, the outputs of the comparators 61-63 are "H" and the output of the comparator 60 is "L". Thus, the outputs of the AND gates 64, 66, 67 are "L" and the output of the AND gate 65, that is, the signal for the selected shutter time is switched between "H" and "L" at a repetition rate of a multivibrator which comprises capacitors 74 and 75, inverters 76 and 77 and resistors 78 and 79. This output signal is transmitted to the terminal STA of the display circuit of FIG. 15. When the voltage applied to the terminal CP-2 is higher than the voltage $v_{30}$, that is, when the circuit of the flash device is being powered and the light emission period selected by the switch $S_3$ is transmitted to the terminal CP-2 through the terminals $v_2$ and $v_1$, the comparator 63 produces an "H" level output. This output is supplied to a terminal INH of the display circuit 55 as an inhibit signal to inhibit the indication of the display circuit 55 in accordance with the inputs from the shutter time generation circuit 51 and the A/D converter 54.

The display circuit 55 operates in the following manner. When the switch $S_9$ is ON, the outputs of the AND gates $GA_{401}$-$GA_{411}$ are "L" and the auto-selected shutter time (1-1/1000 second in the illustrated embodiment) signal generated by the A/D converter 54 causes a corresponding one of the outputs of the AND gates $GB_{401}$-$GB_{411}$ to assume "H". As a result, a corresponding one of the outputs of the OR gates $G_{401}$-$G_{411}$ assumes "H" and a corresponding one of the light emitting diodes $D_{401}$-$D_{411}$ is fired. When the switch $S_9$ is OFF, that is, when the manual exposure control is effected, the outputs of the AND gates $GB_{401}$-$GB_{411}$ are "L" and the shutter time signal from the circuit 51 is applied to a corresponding one of the AND gates $GA_{401}$-$GA_{411}$ so that a corresponding one of the shutter time indication light emitting diodes is fired.

A display drive signal is sent from the terminal STA of the interface circuit 56 to the terminal STA of the display circuit 55 and one of the light emitting diodes $D_{401}$-$D_{408}$ which indicates the shortest one of the shutter times synchronous with the selected maximum light emission period (the shortest shutter time of 1/125 second in the illustrated embodiment) blinks. The shutter time indicated by the blinking of the LED corresponds to the maximum light emission time currently set in the flash device. If it is desired to indicate not only the shortest one of the synchronous shutter times but also all other synchronous shutter times, the inverters 68-70 shown in FIG. 14 may be deleted. A user can determine a range of synchronous shutter times by watching the blinking LED's so that he or she can select a shutter time suitable to an intended photography.

The signal INH from the interface 56 of FIG. 14 is also sent to the time control circuit 131 through the terminal INH of the exposure control circuit 53 shown in FIG. 20 to inhibit the input from the arithmetic circuit 130, and the shortest synchronous shutter time signal from the interface 56 is supplied through the terminal STA of the interface 56 and the terminal STA of the exposure control circuit 53 so that the time control circuit is operated by the input signal at the same value as the indicated value.

The light metering circuit 58 is constructed as shown in FIG. 16. Assume that the photo-current of a photo-diode 94 is $I_L$, the collector current of a transistor 96 is $I_C$, the backward saturation current of the transistor 96 is $I_S$ and voltages applied to terminals SV-2 and SV-3 are $V_{S2}$ and $V_{S3}$, respectively. Assuming that the transistor 98 and the diode 95 have matched characteristics, the following equation is obtained.

$$V_{S3} + \frac{KT}{q} \ln \frac{I_L}{I_S} \approx V_{S2} + \frac{KT}{q} \ln \frac{I_C}{I_S}$$

Thus, $$I_C = I_L \exp\left\{ \frac{q(V_{S3} - V_{S2})}{KT} \right\}$$

When the synchronizing contact of the camera device is turned on and the terminal ST assumes an "L" level, the transistors 97 and 98 are turned off. Accordingly, a charge voltage $V_{89}$ of an integration capacitor 89 is given by:

$$V_{89} = \int_0^t I_C dt = I_L \cdot t \cdot \exp\left\{ \frac{q(V_{S3} - V_{S2})}{KT} \right\} = I_L \cdot t \cdot 2^{\frac{V_{S3} - V_{S2}}{\frac{KT}{q} \ln 2}}$$

Since $KT/q \approx 25.6$ mV at room temperature, the third term of the above equation indicates that it changes by a factor of $2^N$ whenever $(V_{S3}-V_{S2})$ changes by $KT/q \ln 2 \approx 18$ mV. Accordingly, in setting the ASA speed value which results in the change of the resistance of the potentiometer 107 of FIG. 17, a change of 18 mV per step may be imparted so that an amplification factor of the photocurrent is changed accordingly. When the charge voltage of the integration capacitor 89 reaches the zener voltage of a zener diode 99, the output of a comparator 93 changes from "L" to "H", which is produced at a terminal STP, and this output is transmitted to the terminal $a_3$ of the switch $S_6$ of FIG. 12 through the terminal STP of FIG. 14 and the terminals $y_1$ and $y_2$. By connecting the switch $S_6$ to the terminal $a_3$, the output of the light metering circuit 58 controls the light controller 33. The circuit 52 shown in FIG. 17 generates a voltage which is proportional to absolute temperature. Assuming that the transistors 109 and 110 have matched characteristics, equal backward saturation current $I_S$ and sufficiently large $h_{FE}$, the base current of the transistor 110 can be neglected and the following equations are obtained.

$$\frac{KT}{q} \ln \frac{I_A}{I_S} = \frac{KT}{q} \ln \frac{I_B}{I_S} + R_{106} I_E$$

$$R_{103} I_A = R_{105} I_B$$

$$I_E = \frac{1}{R_{106}} \cdot \frac{KT}{q} \ln \frac{R_{105}}{R_{103}}$$

where $I_A$, $I_B$, and $I_E$ are emitter currents of the transistors 109, 110 and 111, respectively, and $R_{103}$, $R_{105}$ and $R_{106}$ are resistances of the resistors 103, 105 and 106, respectively.

Assuming that $h_{FE}$ of the transistor 110 is sufficiently large, $$I_E \approx I_C$$

Accordingly, $$I_C \doteq \frac{1}{R_{106}} \cdot \frac{KT}{q} \ln \frac{R_{105}}{R_{103}}$$

Thus, this current is proportional to the absolute temperature. By properly setting the resistance of the potentiometer 107, voltages proportional to the absolute temperature are developed at the terminals SV-2 and SV-3. A voltage difference $S_V$ between the midpoint of the potentiometer 107 and ground is given by $$V_{SV} = \frac{R_x}{R_{106}} \cdot \frac{KT}{q} \ln \frac{R_{105}}{R_{103}}$$

where $R_x$ is the resistance between the midpoint of the potentiometer 107 and ground. Thus, this voltage is also proportional to the absolute temperature.

The circuit 51 for generating the shutter time signal is shown in FIG. 19. Switches $S_{10}$ and $S_{11}$ are ganged. In the illustrated embodiment, an analog voltage corresponding to 1-1/1000 second is supplied from the switch $S_{10}$ to terminals MTV-1 and MTV-2 through an operational amplifier 113. The switch $S_{11}$ supplies a digital signal corresponding to a shutter time to a terminal MTV-3. An operational amplifier 112 receives the voltage which is proportional to the absolute temperature from the terminal SV-3 and converts it to a voltage level suitable to develop a voltage corresponding to the shutter time.

The exposure control circuit 53 is shown in FIG. 20. An arithmetic circuit 130 receives the output of the light metering circuit of FIG. 18 at a terminal $B_v$ and an ASA speed value at a terminal SV-1 and supplies a calculated shutter time to a time control circuit 131. The circuit 131 normally supplies the output of the arithmetic circuit 130 to a magnet control circuit 132 to control a shutter. When the flash device is used, a signal is applied to a terminal INH and the time signal from the interface circuit 56 is applied to a terminal STA and the magnet control circuit 132 is controlled by the output of the time control circuit 131 so that the shutter time is controlled.

In the embodiments heretofore described, the inhibit signal INH may be suppressed or the application thereof to the circuits 53 and 55 may be suppressed. An embodiment in which the signal INH is not used is now described. The output of the shutter time generation circuit 51 of FIG. 19 is supplied to the time control circuit 131 of FIG. 20 through the terminal MTV-1 so that the shutter time of the camera device is controlled by the magnet control circuit 132. The shutter time signal from the terminal MTV-3 of the circuit 51 is supplied to the first input terminals of the AND gates $GA_{401}$-$GA_{411}$ of the display circuit 55 of FIG. 15. Since the signal INH is not present at this time, one of the light emitting diode $D_{401}$-$D_{411}$ corresponding to the selected shutter time is continuously fired.

Apart from this, one of the light emitting diodes corresponding to the shortest one of the shutter times synchronous with the selected maximum light emission period blinks. The switches $S_{10}$ and $S_{11}$ of the circuit 51 are selected by the shutter dial 5 of the camera device such that the continuously fired light emitting diode coincides with the shutter time corresponding to the blinking light emitting diode, so that the shortest shutter time synchronous with the selected maximum light emission period can be selected. It is of course possible to set the shutter time longer than the shortest shutter time. A user can select any shutter time suitable for his or her intended photography by watching the shutter times indicated by the blinking light emitting diode and the continuously fired light emitting diode.

Figure 21:
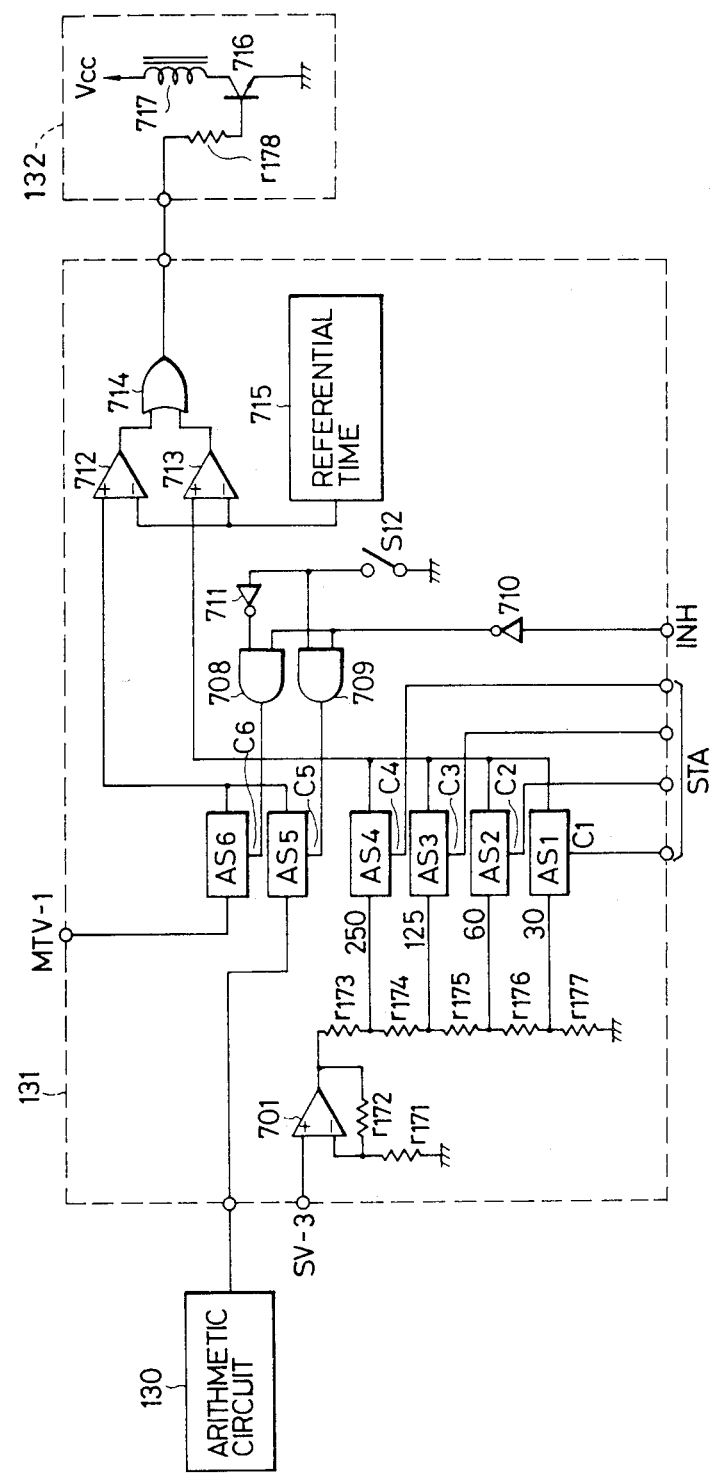
FIG. 21 shows a detail circuit diagram of FIG. 20.

FIG. 21 shows a detail of the time controlled circuit 131 and the magnet control circuit 132. An operational amplifier 701 and resistors $r_{171}$-$r_{177}$ function in exactly the same manner as the manual shutter voltage generation circuit of FIG. 19 which comprises the operational amplifier 112 and the resistors 114-126 of the circuit 51. The only difference is that the voltage developed corresponds to a shutter time of 1/30-1/250 second. Analog switches $AS_1$-$AS_6$ are ON when inputs to control input terminals $C_1$-$C_6$ are "H", and OFF when the latter are "L". When a switch $S_{12}$ which selects an auto-exposure control or a manual exposure control is turned ON, one of input terminals of an AND gate 709 assumes "L" while one of input terminals of an AND gate 708 assumes "H" because it is connected to an inverter 711. Accordingly, if the inhibit input terminal INH is "L", an output of the AND gate 708 is "H" and the analog switch $AS_5$ is turned ON so that the calculated voltage from the arithmetic circuit 130 is supplied to a comparator 712. If the switch $S_{12}$ is OFF and the terminal INH is "L", the manual mode is selected and the analog switch $AS_6$ is turned ON so that the manual voltage is supplied to the comparator 712 through the terminal MTV-1. When the input to the terminal INH is "H", the outputs of the AND gates 708 and 709 are "L" and the analog switches $AS_5$ and $AS_6$ are OFF. Thus, no voltage is supplied to the comparator 712. When the signals are applied to the terminals STA from the interface circuit 56, the analog switches $AS_1$-$AS_4$ supply the corresponding shutter time voltages to a comparator 713. A reference time generation circuit 715 is connected to second input terminals of the comparators 712 and 713. When the input voltage to the comparator 712 or 713 is equal to the output voltage of the circuit 715, the output of the comparator 712 or 713 changes from "H" to "L". As a result, a transistor 716 is turned off and a closing curtain driving magnet 717 releases an armature so that the closing curtain starts to move. The comparator 712 compares the auto-voltage and the manual voltage of the camera device. The comparator 713 compares the voltage corresponding to the synchronizing time for the flash device. In a normal photography mode, the comparator 712 is used, and in the flash photography mode, the input to the comparator 712 is inhibited by the signal INH and the comparator 713 is operated. If the signal INH is not inputted in the flash photography mode, the shutter time is controlled by one of the input voltages to the comparators 712 and 713 which corresponds to a longer shutter time, because the outputs of the comparators 712 and 713 are connected to the OR gate 714. Thus, the synchronous shutter time can be selected by utilizing the display circuit.

Figure 22:
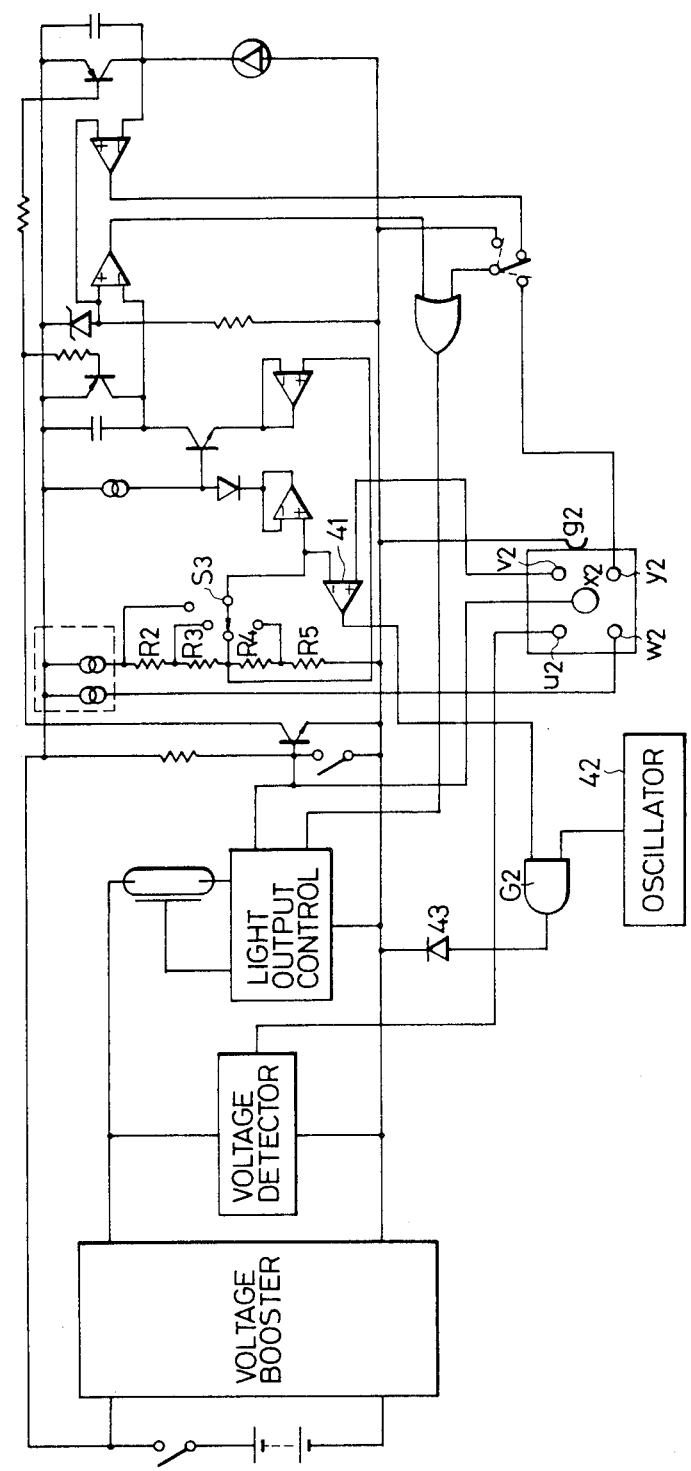
FIG. 22 shows a circuit diagram of the flash device in accordance with other embodiment.

In an embodiment of the flash device shown in FIG. 22, an alarm is issued in the flash device if the shutter time set by the camera device is not adapted to the maximum light emission period. In FIG. 22, elements like those of the circuit of FIG. 12 are designated with reference numerals or designated by the like numerals. A voltage derived by selecting the switch $S_3$ to set the maximum light emission period is supplied to an inverting input terminal of the comparator 41. A voltage signal corresponding to a shutter time set by the camera device is applied to a non-inverting input terminal of the comparator 41 through the terminal $v_2$. If an aperture full-open time $t_f$ derived from the selected shutter time is shorter than the maximum light emission period, the comparator 41 produces an "H" output which is supplied to the AND gate $G_2$. Thus, the output of the AND gate $G_2$ is switched between "H" and "L" at the frequency of an output of an oscillator 42 so that a light emitting diode 43 blinks to issue an alarm.

Thus, a user manipulates the switch $S_3$ to shorten the light emission period or increase the shutter time. As a result, the output of the comparator 41 assumes "L" and the light emitting diode 43 is turned off and the alarm is released.

Figure 23:
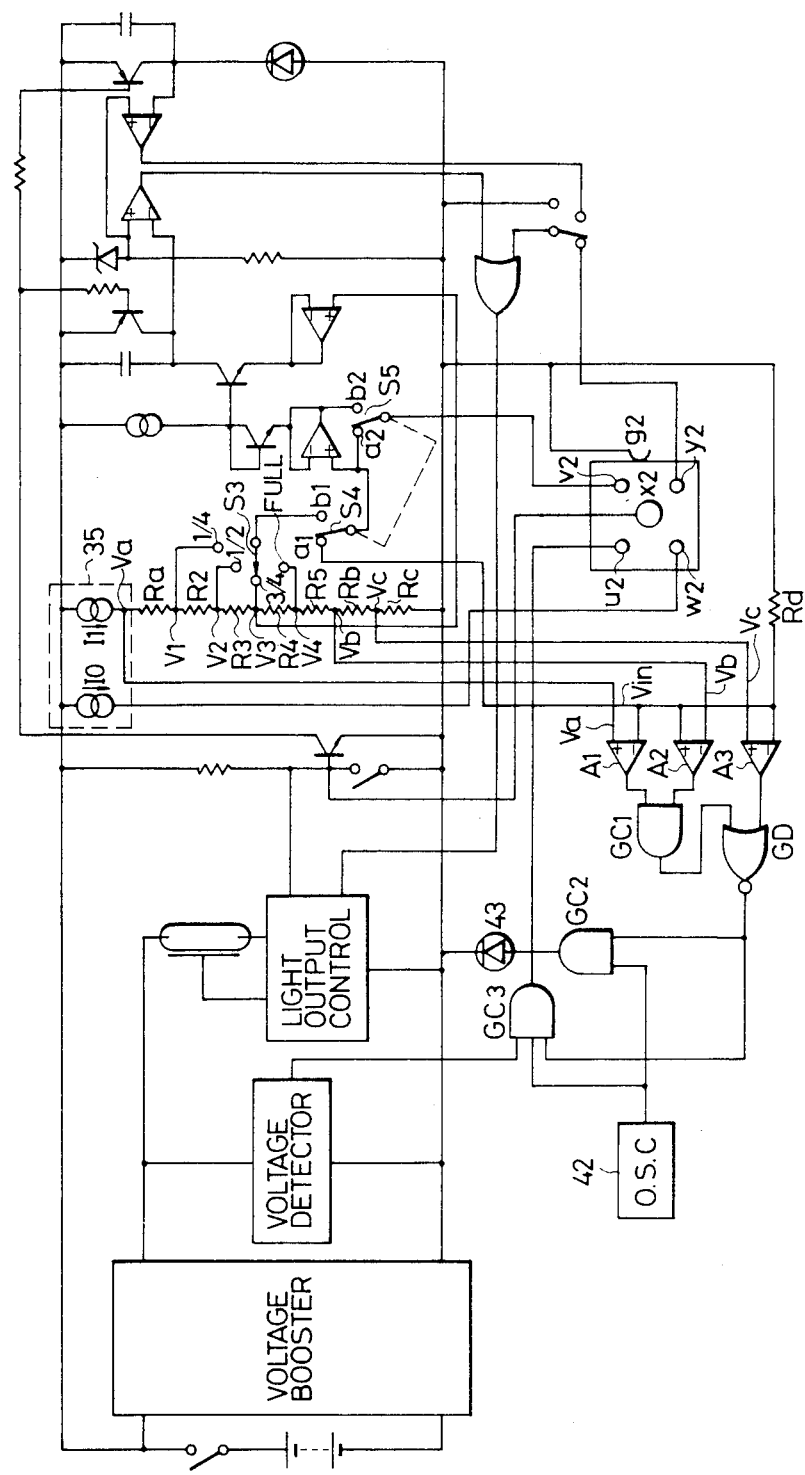
FIG. 23 shows a circuit diagram of the flash device in accordance with a further embodiment.

A further embodiment of the flash device is shown in FIG. 23. In this embodiment, the alarm is issued in both the flash device and the camera device, and it is disabled when the shutter time of the camera device is to be controlled with a preference being given to the maximum light emission period set by the flash device.

Ganged switches $S_4$ and $S_5$ are connected to terminals $a_1$ and $a_2$, respectively, and the shutter time information of the camera device is supplied to an operational amplifier 36 to control the light emission period. Resistors are connected to a light emission period selection switch $S_3$, and voltage drops $V_1$-$V_4$ across the respective resistors are chosen in accordance with the light exposure period. The voltage $V_1$ corresponds to a minimum light emission period and the voltage $V_4$ corresponds to a maximum light emission period. A voltage $V_a$ is set to be slightly larger than the minimum light emission period voltage $V_1$. A voltage $V_b$ is set to be slightly lower than the voltage $V_4$. A voltage $V_c$ is set to be slightly higher than a ground level.

Comparators $A_1$ and $A_2$ form a window comparator which determines if an input voltage to a terminal $v_2$ is between the minimum and maximum light emission periods of the flash device. A comparator $A_3$ determines whether the switch $S_4$ is connected to the terminal $a_1$ or $b_1$. When the switch $S_4$ is connected to the terminal $b_1$, the inputs to the comparators $A_1$-$A_3$ are at ground level by a resistor Rd and the output of the comparator $A_3$ is "L", which disables the alarm circuit. A light emitting diode 43 in the flash device blinks in response to the output of an AND gate $GC_2$ to inform the user that a proper range has been exceeded. An output of an AND gate $GC_2$ is supplied to the camera device through the terminal $v_2$ so that the light emitting diode 83 in the camera device of FIG. 14 blinks to issue the alarm.

A truth table is shown below.

|  | $0 < V_{in} < V_c$ | $V_c < V_{in} < V_b$ | $V_b < V_{in} < V_a$ | $V_a < V_{in}$ |
| --- | --- | --- | --- | --- |
| $A_1$ out | H | H | H | L |
| $A_2$ out | L | L | H | H |
| $A_3$ out | H | L | L | L |
| $GC_1$ | L | L | H | L |
| GD | L | H | L | H |
| $GC_2$ | L | H⇌L | L | H⇌L |
| $GC_3$ | L | H⇌L | L | H⇌L |
| Voltage Detection Output "L" | L | L | L | L |

The shutter time information from the camera device is transmitted to the flash device throught the terminal $v_2$ when the switch $S_8$ of FIG. 14 is turned on by the terminal MTV-2 of FIG. 19.

We claim:

1. A camera device adapted to be coupled with a flash device for discharging light energy for illuminating an object for a predetermined very short time period, for exposing an image of said object illuminated by said light energy to a film, said camera device having a focal plane shutter of an adjustable exposure time, comprising:

(a) means for presetting said exposure time;
(b) means for producing an output representing said preset exposure time; and
(c) means for transmitting said output to said flash device when said camera device is coupled to said flash device.

2. A camera device according to claim 1, wherein said output producing means includes a member responsive to said presetting means that mechanically moves its position by a distance corresponding to said exposure time.

3. A camera device according to claim 1, wherein said output producing means includes means responsive to said presetting means for producing a voltage output corresponding in magnitude to said exposure time.

4. A photography system for photographing an object illuminated by light energy, comprising:
(a) a flash device for discharging said light energy for a predetermined very short period, including means for producing an output representing a maximum discharge time period permitted to discharge said light energy; and
(b) a camera device including a focal plane shutter adjustable to define one of various exposure times, means for producing a signal to synchronize discharging of said light energy by said flash device to the exposure by said shutter, and means responsive to said output from said output means of said flash device for displaying information on an exposure time adaptable to said maximum discharge time period, said displaying means including means for producing outputs corresponding to respective ones of said exposure times, means for comparing said exposure time outputs with said output from said output means of said flash device to select one of said exposure time outputs, and a display adapted to be driven by said selected one output.

5. A photography system according to claim 4 wherein said displaying means includes means for displaying a shortest one of the exposure times adaptable to said maximum discharge time period.

6. A photography system according to claim 4 further comprising means for coupling said flash device to said camera device, said coupling means including means for transmitting said synchronizing signal from said output means of said camera device to said flash device, and means for transmiting said output from said output means of said flash device to said camera device.

7. A photography system for photographing an object illuminated by light energy, comprising:
(a) a flash device for discharging said light energy for a predetermined very short time period, including means for producing an output representing a maximum discharge time period permitted to discharge said light energy;
(b) a camera device including a focal plane shutter adjustable to define one of various exposure times, means for producing a signal for synchronizing discharging of said light energy by said flash device to the exposure by said shutter, and control means for controlling said focal plane shutter to define an exposure time and producing an output representing said exposure time; and
(c) means provided with a comparator which compares said output from said flash device with said output from said control means for issuing an alarm when said exposure time is shorter than said maximum discharge time period.

8. A photography system for photographing an object illuminated by light energy, comprising:
(a) a flash device for discharging said light energy for a predetermined very short time period, including means for producing an output representing a maximum discharge time period permitted to discharge said light energy; and
(b) a camera device including a focal plane shutter adjustable to define one of various exposure times, means for producing a signal for synchronizing discharging of said light energy by said flash device to the exposure by said shutter, and control means responsive to said output from said output means of said flash device for controlling said focal plane shutter to define an exposure time adaptable to said maximum discharge time period, said control means including means for producing outputs representing respective ones of said various exposure times, means for comparing said exposure time outputs with said output from said output means of said flash device to select one of said exposure time outputs, and means responsive to said selected one output to control said focal plane shutter.

9. A flash device adapted to be coupled to a camera device for discharging light energy for illuminating an object for a predetermined very short time period in synchronism with light exposure of a film of said camera device by utilizing a charge stored in a capacitor, said camera device including a focal plane shutter adjustable to define one of various exposure times, means for producing a signal for synchronizing discharging of said light energy by said flash device to the exposure by said shutter, and control means for controlling said focal plane shutter to define an exposure time and producing a first output representing said exposure time, said flash device comprising:
(a) means for producing a second output representing a maximum discharge time period permitted to discharge said light energy; and
(b) means provided with a comparator which compares said first output with said second output, for issuing an alarm when said exposure time is shorter than said maximum discharge time period.

10. A photographing system for photography an object illuminated by light energy, comprising:
(a) a camera device including a focal plane shutter, means for presetting an exposure time, means for driving said shutter to define said preset exposure time, and means for producing an output representing said preset exposure time; and
(b) a flash device responsive to the drive of said shutter for discharging said light energy for a predetermined very short time period, said flash device including means responsive to said output from said output means of said camera device for displaying information on a maximum discharge time period for said light energy within a range adaptable to said preset exposure time.

11. A flash device adapted to be coupled to a camera device for discharging light energy for illuminating an object for a predetermined very short time period in synchronism with light exposure of a film of said camera device by utilizing a charge stored in a capacitor, comprising:
control means provided with a photodetector which receives said light energy reflected from said object for generating a first control output when said light energy incident on said photodetector reaches a predetermined quantity;

means for providing a signal representing a maximum discharge time permissible to discharge said light energy;

timing means for generating a second control output when said maximum discharge time has elapsed after the discharge of said light energy starts;

means responsive to one of said first and second control outputs which precedes the other in timing for stopping the discharge of said light energy; and means for transmitting said signal to said camera when said flash device is coupled to said camera.

12. A flash device according to claim 11 further comprising changing means manipulated to change said maximum discharge time period, and wherein said signal providing means changes said signal in response to the manipulation of said changing means.

13. A flash device adapted to be coupled to a camera device for discharging light energy for illuminating an object for a predetermined very short time period in synchronism with light exposure of a film of said camera device by utilizing a charge stored in a capacitor, wherein said camera device includes control means provided with a photodetector which receives said light energy reflected from said object for generating a first control output when said light energy incident on said photodetector reaches a predetermined quantity, said flash device comprising:

means for deriving said first control output from said camera device when said flash device is coupled to said camera device;

means for providing a signal representing a maximum discharge time permissible to discharge said light energy;

timing means for generating a second control output when said maximum discharge time has elapsed after the discharge of said light energy starts;

means responsive to one of said first and second control outputs which precedes the other in timing for stopping the discharge of said light energy; and means for transmitting said signal to said camera device when said flash device is coupled to said camera device.

14. A flash device according to claim 13 further comprising changing means manipulated to change said maximum discharge time period, and wherein said signal providing means changes said signal in response to the manipulation of said changing means.

* * * * *